(12) United States Patent
Ikemura et al.

(10) Patent No.: US 7,242,689 B2
(45) Date of Patent: Jul. 10, 2007

(54) MOBILE IP COMMUNICATION TERMINAL, MOBILE IP COMMUNICATION METHOD, AND COMPUTER PRODUCT

(75) Inventors: Shinichi Ikemura, Kawasaki (JP); Fumihiko Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 269 days.

(21) Appl. No.: 11/102,787

(22) Filed: Apr. 11, 2005

(65) Prior Publication Data
US 2006/0062176 A1 Mar. 23, 2006

(30) Foreign Application Priority Data
Sep. 17, 2004 (JP) ............................. 2004-272383

(51) Int. Cl.
*H04L 12/28* (2006.01)
(52) U.S. Cl. ................. 370/401; 370/352; 370/389
(58) Field of Classification Search ............... 370/401, 370/352, 389, 392, 229, 230, 235, 254, 329, 370/338, 395.5; 709/222, 223, 226, 227
See application file for complete search history.

(56) References Cited

U.S. PATENT DOCUMENTS 7,149,225 B2* 12/2006 Thubert et al. ............. 370/401
7,158,526 B2* 1/2007 Higuchi et al. ............. 370/401
2002/0159461 A1* 10/2002 Hamamoto et al. ......... 370/392
2004/0165602 A1* 8/2004 Park et al. .................. 370/401

FOREIGN PATENT DOCUMENTS

JP 2003-018185 1/2003

* cited by examiner

*Primary Examiner*—Edward F. Urban
*Assistant Examiner*—Christian A. Hannon
(74) *Attorney, Agent, or Firm*—Bingham McCutchen LLP

(57) ABSTRACT

A mobile IP communication terminal connected to a network at a remote place decides whether position registration can be performed by the IP (IPv4). When the position registration is possible, a normal position registration process is performed. When the position registration is impossible, the mobile IP communication terminal uniquely generates a CoA (Care of Address), edits a position registration signal, and transmits a position registration signal to a network repeater, which has a position registration function of the mobile IP communication terminal, based on a header obtained by an IP (IPv6) of the network to which the mobile IP communication terminal is connected and a designated IP (UDP).

12 Claims, 13 Drawing Sheets

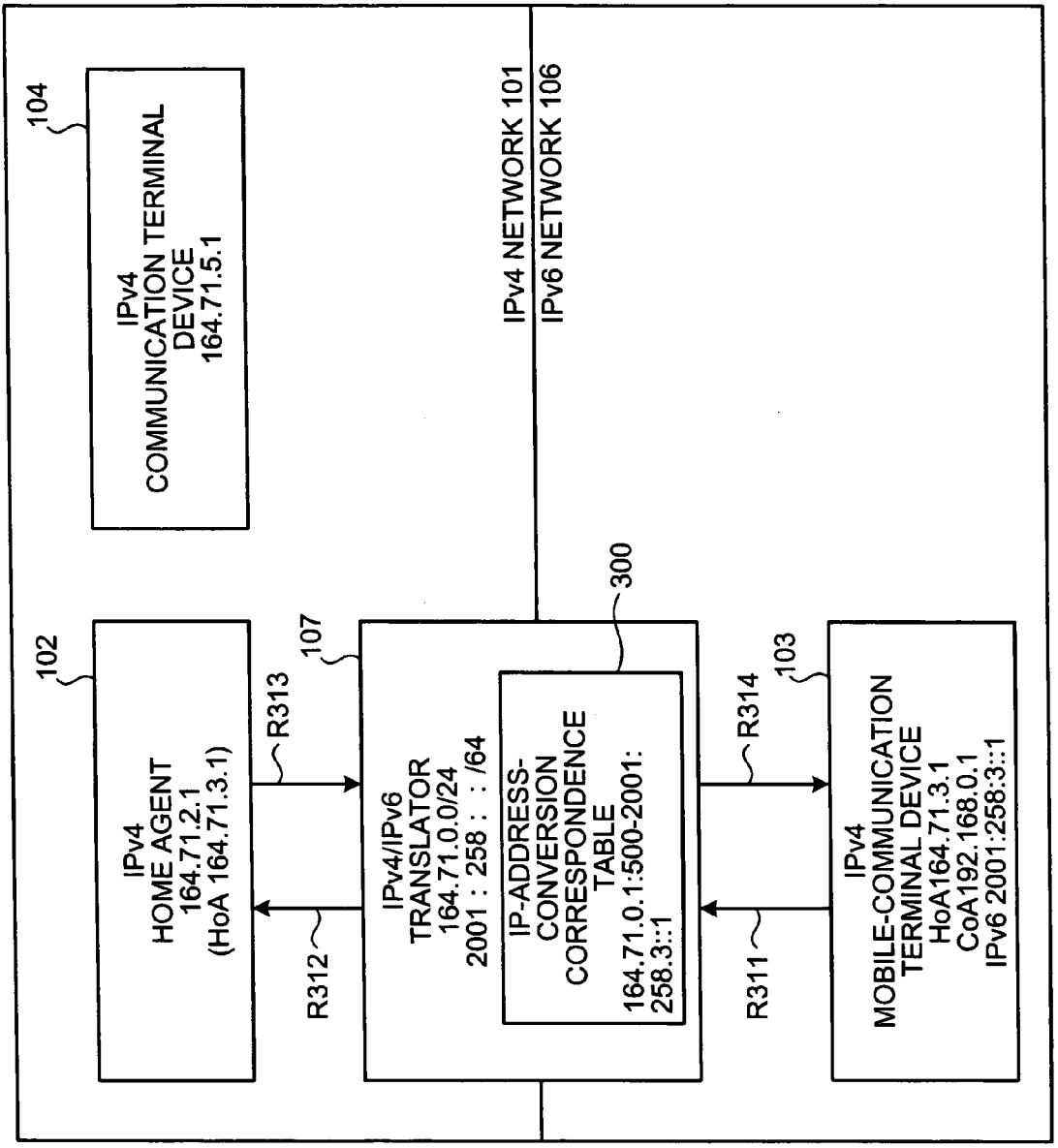

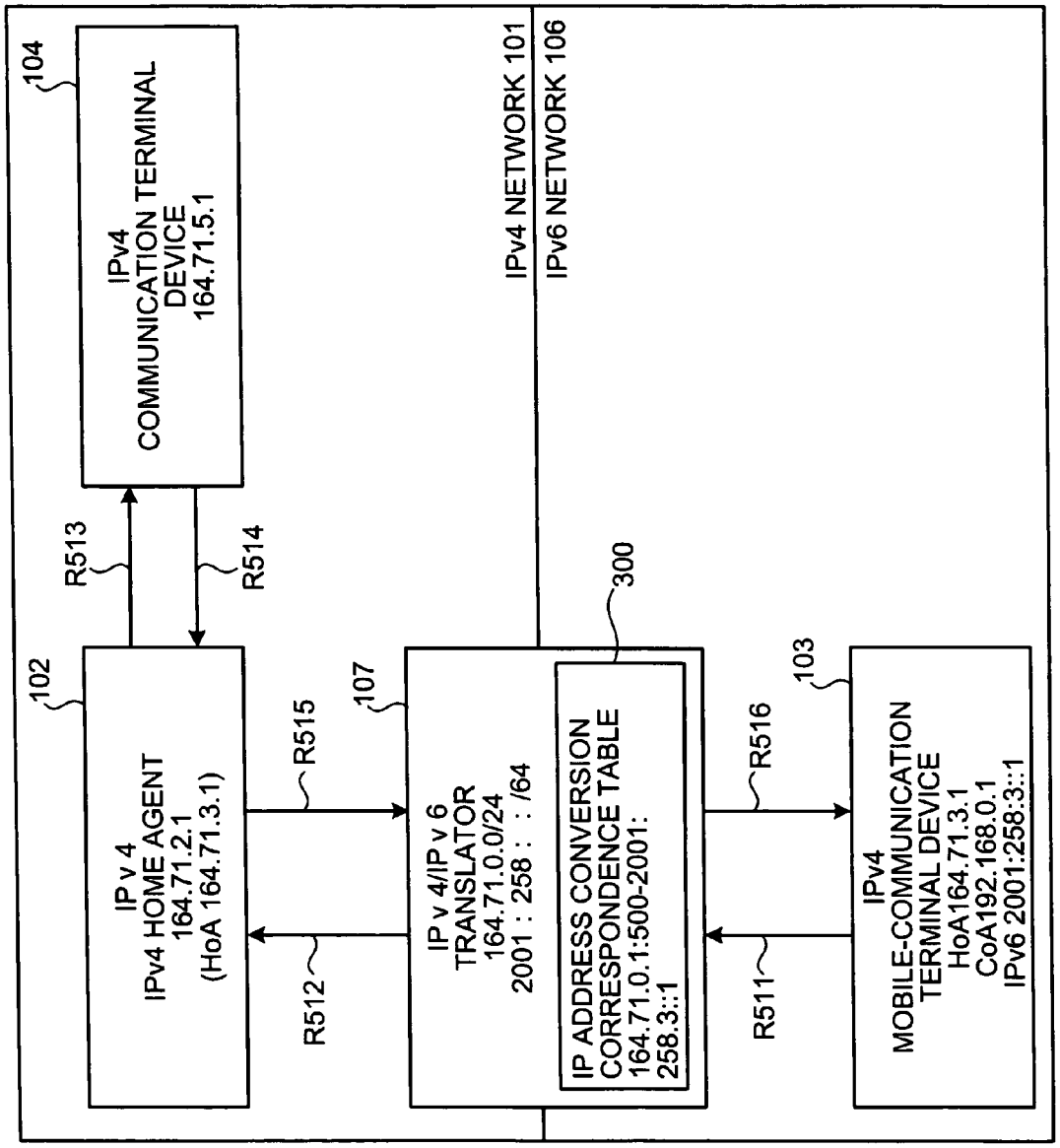

MOBILE IP COMMUNICATION TERMINAL, MOBILE IP COMMUNICATION METHOD, AND COMPUTER PRODUCT

CROSS-REFERENCE TO RELATED APPLICATIONS

The present document incorporates by reference the entire contents of Japanese priority document, 2004-272383 filed in Japan on Sep. 17, 2004.

BACKGROUND OF THE INVENTION

1) Field of the Invention

The present invention relates to a technology for performing mobile internet-protocol (IP) communication on a network in which a plurality of IPs coexist.

2) Description of the Related Art

IP version 4 (IPv4) is a protocol of a network layer, and is used for packet communication in the Internet. IP addresses of IPv4 are allocated to IP communication terminals that are connected to the networks that follow IPv4. The IP address is used to identify each communication terminal and specify a position of the IP communication terminal. In other words, if one IP communication terminal wants to perform communication with other IP communication terminal connected to the network, the one IP communication terminal must know an IP address of the other IP communication terminal.

If the other IP communication terminal is a fixed communication terminal, i.e., an IP communication terminal that is always connected to a network through the same router (network repeater), a problem does not occur; because, the IP address of the other IP communication terminal is known and the IP address does not change. However, if the other IP communication terminal is a mobile communication, i.e., an IP communication terminal that is connected to a network through different routers each time the other IP communication terminal is connected to the network, its IP address changes each time it is connected to the network, and it becomes necessary to identify its IP address each time.

Conventionally, a mobile IP communication terminal performs packet communication by the following method. FIG. 10 is a schematic of an IPv4 mobile communication terminal 702 in an IPv4 network 700. It is assumed that the IPv4 mobile communication terminal 702 performs communications with an IPv4 communication terminal 703 via the IPv4 network 700. The mobile communication terminal 702 is shown to be connected to the IPv4 network 700 through a router 704b; however, the IPv4 mobile communication terminal 702 can be moved, as shown in FIG. 10 with an arrow, and connected to the IPv4 network 700 through a router 704c.

When the IPv4 mobile-communication terminal 702 is connected to the IPv4 network 700, the IPv4 mobile-communication terminal 702 acquires Care of Address (hereinafter, "CoA") from the IPv4 network 700. The CoA is used as a temporary IP address and indicates connection position of the IPv4 mobile-communication terminal 702. The IPv4 mobile-communication terminal 702 edits a registration information signal to register the CoA and transmits the registration information signal to the IPv4 home agent 701 via the IPv4 network 700. The IPv4 mobile-communication terminal 702 sets Home Address (hereinafter, "HoA") in the IPv4 home agent 701 as a fixed IP address, and notifies the IPv4 communication terminal 703 of the HoA as a receiving address. As a result, when the IPv4 communication terminal 703 transmits a packet to the HoA, the packet is always received by the IPv4 home agent 701. Then, the IPv4 home agent 701 transfers the packet to the registered CoA, i.e., to the IPv4 mobile communication terminal 702.

FIG. 11 is a schematic for explaining encapsulation of a packet when the packet is transmitted to a mobile communication terminal through an IPv4 network, FIG. 12A is a schematic for explaining a packet when mobile communication is performed through an IPv4 network, and FIG. 12B is a schematic for explaining encapsulated packet when mobile communication is performed through an IPv4 network.

As shown in FIG. 11, a packet is transferred based on an HoA-CoA correspondence table 800 that is stored in the IPv4 home agent 701. A packet on a route R801 between the IPv4 communication terminal 703 and the IPv4 home agent 701 has a configuration as a packet model 820 shown in FIG. 12A. The packet model 820 includes a header 821, which has a destination address and a source address, and a payload 822 corresponding to user's data. A packet on a route R802 between the IPv4 home agent 701 and the IPv4 mobile-communication terminal 702 has a configuration as a packet model 830 shown in FIG. 12B. The packet model 830 includes the packet model 820 and a header 831. The header 831 includes CoA of the destination terminal as a destination address and the address of HAv4 as a source address. Such a process of encapsulating one packet, i.e., the packet model 820, in other packet, i.e., the packet model 830, is called packet encapsulation. When the packet model 830 arrives at the IPv4 mobile-communication terminal 702, the packet model 830 is decapsulated to obtain the packet model 820.

IPv4 has a 32-bit address; however, recently the address is thought to be too short to express required information. As a countermeasure, an IP version 6 (IPv6), which has a longer address, i.e., a 128-bit address, has been developed.

However, it is physically impossible, or, it is impossible under circumstances of users, to shift all the IP environments from IPv4 to IPv6; therefore, currently both IPv4 and IPv6 coexist. Therefore, if two or more protocols coexist in a network, it becomes necessary to switch protocols in such a manner that the communication can be performed seamlessly. Japanese Unexamined Patent Publication No. 2003-18185 discloses a method for this purpose.

It has been anticipated that IPv6 is going to be the main trend in the future, and that an IPv4 mobile-communication terminal may not be used in several cases. For example, an IPv4 mobile communication terminal cannot be used in a network that supports only IPv6. Moreover, an IPv4 mobile-communication terminal can not be used if an IPv4 address for CoA of a mobile-communication terminal cannot be acquired in a network even though the network supports both IPv4 and IPv6, and if it is impossible to perform packet communication with an external network by IPv4 in a network.

SUMMARY OF THE INVENTION

It is an object of the present invention to at least solve the problems in the conventional technology.

According to one aspect of the present invention, In a mobile internet-protocol (IP) communication terminal that supports a first IP, and can be connected to a first network that supports the first IP and a second network that supports a second IP that is different from the first IP, when the mobile IP communication terminal is connected to the second network via a second repeater and performs a packet communication with an IP communication terminal that supports the first IP, the first network and the second network are connected via a translator to perform a packet communication, and the mobile IP communication terminal registers a connection position of the mobile IP communication terminal with a first repeater that has a packet transfer function. Moreover, the mobile IP communication terminal includes an IP deciding unit that decides whether the mobile IP communication terminal is connected to the first network or the second network; a unique-address generating unit that generates a first address that is unique to the mobile IP communication terminal, when the IP deciding unit decides the mobile IP communication terminal is connected to the second network; a translator-through address generating unit that generates a second address so as to connect the mobile IP communication terminal to the first network via the translator, based on position information of the translator stored in the second repeater, and a translator-through position-registration-signal transmitting unit that transmits a registration signal, for registering the connection position, to the first repeater, the registration signal including a destination address and a source address, the destination address having the second address and an address of the first repeater, the source address having an address of the connection position, and the address of the connection position corresponding to the second IP and acquired from the second network.

According to another aspect of the present invention, in a mobile internet-protocol (IP) communication method performed by a mobile internet-protocol (IP) communication terminal, the mobile IP communication terminal supports a first IP, and can be connected to a first network that supports the first IP and a second network that supports a second IP that is different from the first IP, and when the mobile IP communication terminal is connected to the second network via a second repeater and performs a packet communication with an IP communication terminal that supports the first IP, the first network and the second network are connected via a translator to perform a packet communication, and the mobile IP communication terminal registers a connection position of the mobile IP communication terminal with a first repeater that has a packet transfer function. Moreover, the mobile IP communication method includes deciding whether the mobile IP communication terminal is connected to the first network or the second network based; generating a first address that is unique to the mobile IP communication terminal, when it is decided in the deciding that the mobile IP communication terminal is connected to the second network; generating a second address so as to connect the mobile IP communication terminal to the first network via the translator, based on position information of the translator stored in the second repeater, and transmitting a registration signal, for registering the connection position, to the first repeater, the registration signal including a destination address and a source address, the destination address having the second address and an address of the first repeater, the source address having an address of the connection position, and the address of the connection position corresponding to the second IP and acquired from the second network.

According to still another aspect of the present invention, a computer-readable recoding medium that stores a computer program that implements the above method on the computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a schematic for explaining the position registration process;

FIG. 7 is a schematic for explaining a transmission/reception process of the IPv4 mobile-communication terminal shown in FIG. 1.

DETAILED DESCRIPTION

Exemplary embodiments of the present invention will be described below with reference to the accompanying drawings.

Figure 1:
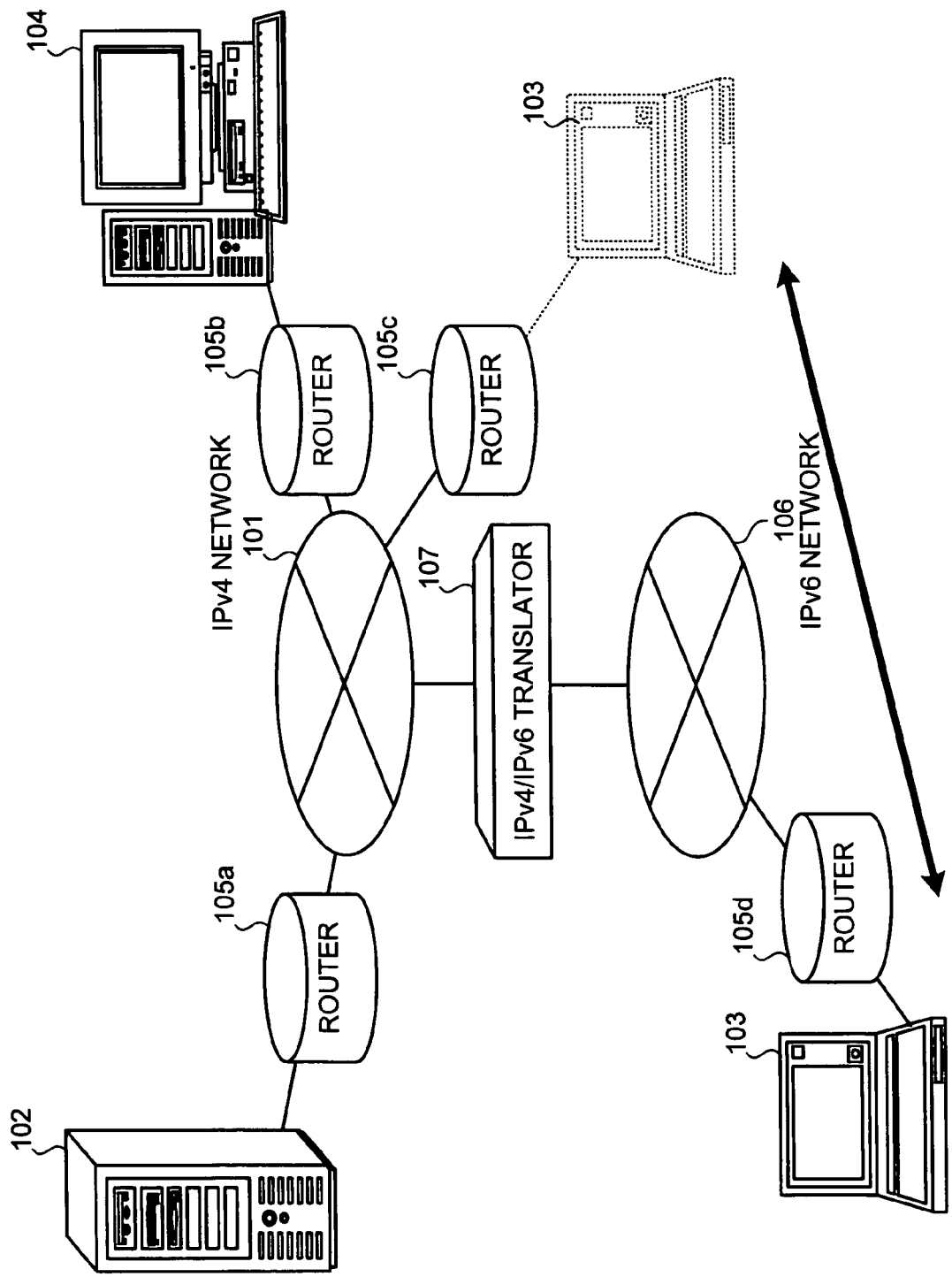
FIG. 1 is a schematic of a network where an IPv4 mobile-communication terminal according to an embodiment of the present invention is used.

FIG. 1 is a schematic of a network in which an IPv4 mobile communication terminal according to an embodiment of the present invention is used. The network includes an IPv4 network 101 that supports IPv6, and an IPv6 network 106 that supports only IPv6.

An IPv4 home agent 102 (first repeater) and an IPv4 communication terminal (Web server) 104 are connected to the IPv4 network 101 through routers 105a and 105b, respectively. An IPv4 mobile communication terminal 103 is connected to the IPv6 network 106 through a router 105d. The IPv4 mobile communication terminal 103 may be moved, as shown by an arrow, and connected to the IPv4 network 101 through a router 105c. The routers 105a to 105d are second repeaters.

It is assumed that the IPv4 communication terminal 104 and the IPv4 mobile communication terminal 103 perform communication via the IPv4 home agent 102. The routers 105a to 105c are connected to the IPv4 network 101, and the router 105d is connected to an IPv6 network 106. The IPv6 network 106 is connected to the IPv4 network 101 via an IPv4/IPv6 translator 107 (translator). The IPv4 home agent 102 has the same function as the IPv4 home agent 701 described in the conventional technique.

The IPv4/IPv6 translator 107 has a prefix function and an address function. The prefix function includes three functions. In the first function, also called a router advertisement function, a translator prefix is notified to the router 105d, which is in the IPv6 network 106. The translator prefix represents a prefix code of a unique IP address of the translator. In the second function, when a packet with an IPv4 address passes from the IPv4 network 101 through the IPv4/IPv6 translator 107, a translator prefix is added to a source address of a header of the IPv4 packet, and the address is changed into an address corresponding to IPv6. In the third function, when a packet passes from the IPv6 network 106 through the IPv4/IPv6 translator 107, a translator prefix is deleted from a destination address of a header of an IPv6 packet, and the address is changed into an address corresponding to IPv4.

In the address function, when the IPv4/IPv6 translator 107 receives an IPv6 packet via the IPv6 network 106, an IPv4 address corresponding to a IPv6 source address is allocated from an IPv4-address accumulation table and the correspondence is stored in an IP-address-conversion correspondence table 300 (see FIG. 4). Moreover, in the address function, when the IPv4/IPv6 translator 107 receives an IPv4 packet, an IPv6 address corresponding to the destination address is retrieved from the IP-address-conversion correspondence table 300 and the IPv6 address is set in the IPv4 packet. The addresses are stored in the IP-address-conversion correspondence table 300 for a predetermined time or until the IPv4/IPv6 translator 107 receives a storage canceling signal, which indicates deletion of the address.

Figure 2:
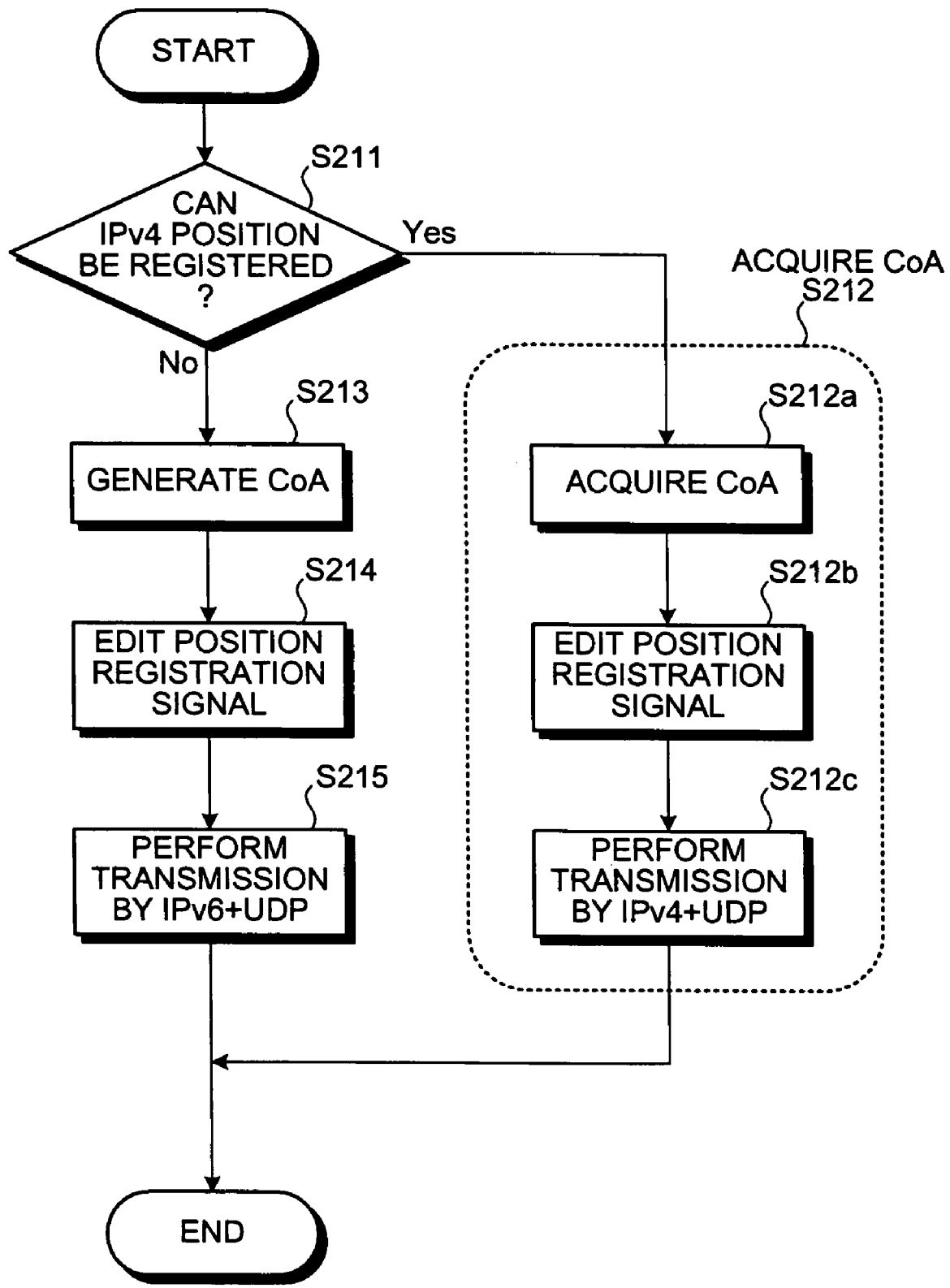
FIG. 2 is a flowchart of a position registration process performed by the IPv4 mobile-communication terminal shown in FIG. 1.
Figure 3:
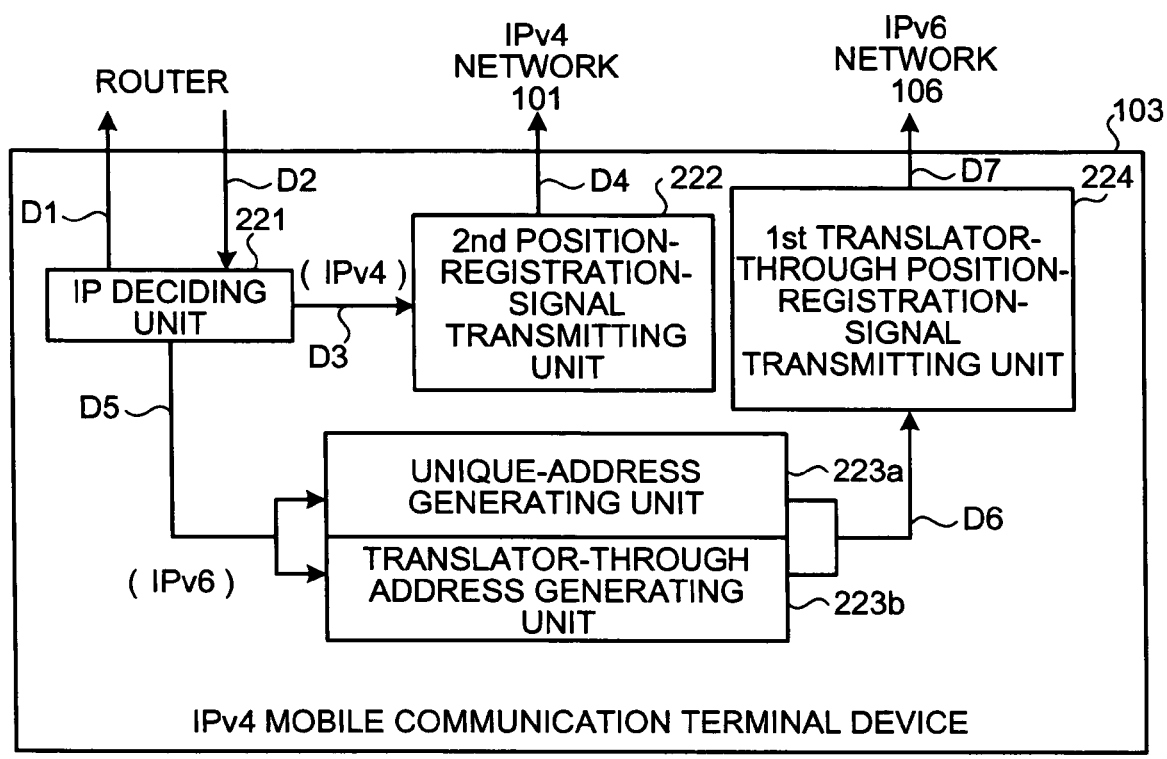
FIG. 3 is a detailed block diagram of the IPv4 mobile-communication terminal shown in FIG. 1.

FIG. 2 is a flowchart of a process of registering position (hereinafter, "position registration process") of an IPv4 mobile communication terminal in a network where two protocols coexist, and FIG. 3 is a detailed block diagram of the IPv4 mobile communication terminal.

The IPv4 mobile-communication terminal 103 includes an IP deciding unit 221, a second position-registration-signal transmitting unit (position-registration-signal transmitting unit) 222, a unique-address generating unit 223a, a translator-through address generating unit 223b, and a first position-registration-signal transmitting unit (translator-through position-registration-signal transmitting unit) 224.

When a user connects the IPv4 mobile-communication terminal 103 to a network via a router, the IPv4 mobile-communication terminal 103 transmits a request signal D1 (DHCP query) to the network so as to acquire CoA. At step S211, the IP deciding unit 221 decides whether position of IPv4 can be registered, based on a response to the request signal D1. If a signal D2 returned from the router 105 is CoA of IPv4, it is determined that the IPv4 mobile communication terminal 103 is connected to a network that supports IPv4. Therefore, it is decided at the step S211 that the position can be registered by using data D3, which includes the CoA acquired, as a source address.

The second position-registration-signal transmitting unit 222 acquires the CoA (step S212a), edits the position-registration signal (step S212b), and transmit a packet D4 (step S212c). The packet D4 includes a payload obtained by (a protocol of IPv4 header)+(user datagram protocol (hereinafter, "UDP")). The processes at steps S212a to S212c are the same as processes performed by a conventional mobile IP communication terminal, which is described in the conventional technique. The UDP at the step S212c is a position registration signal explained later.

FIG. 4 is a schematic for explaining a position registration process performed when the IPv4 mobile communication terminal 103 is connected to the IPv6 network 106, which supports only IPv6. FIGS. 5A to 5D are schematics of packets used in the position registration process. When it is determined at step S211 that IPv4 position registration is impossible, it means that the IPv4 mobile-communication terminal 103 is connected to the IPv6 network 106, and a position registration process for a case that IPv4 cannot be used starts. How a packet is processed at each step in the flowcharts is explained with reference to FIGS. 4 and 5A to 3D.

Various addresses are set as shown in FIG. 4. Specifically, an address of the IPv4 home agent 102 is [164.71.2.1], a translator prefix of the IPv4/IPv6 translator 107 is [2001:258::/64], an IPv4 pool address is [164.71.0.0/24], and HoA of IPv4 mobile communication terminal 103 is [164.71.3.1].

The IPv4 pool address is an accumulation address used for address allocation in the IPv4/IPv6 translator 107. 0/24 at the end of the IPv4 pool address indicates that a netmask of 164.71.0 is 24-bit data.

When the data D2 (router advertisement) is received in response to a CoA acquisition request signal D1 at the step S211, the IPv4 mobile communication terminal 103 generates an IPv6 address, moreover, the IP deciding unit 221 decides that the IPv4 mobile-communication terminal 103 is connected to the IPv6 network 106, which supports only IPv6. The IP deciding unit 221 outputs a signal D5 to cause to generate a packet for IPv6. The unique-address generating unit 223a, upon receiving the signal D5, generates, at step S213, a CoA of IPv4 from a random number or from a predetermined value.

At step S214, the translator-through address generating unit 223b edits a position registration signal for causing to register a position of the IPv4 mobile-communication terminal 103 with the IPv4 home agent 102. Precisely, the translator-through address generating unit 223b sets an address [2001:258::164.71.2.1], i.e., (translator prefix)+(address of the IPv4 home agent 102) to a destination address in a header of an IPv6 packet to be transmitted from the IPv4 mobile-communication terminal 103. The CoA from the unique-address generating unit 223a and the header information of the IPv6 packet from the translator-through address generating unit 223b are combined to form data D6, and the data D6 is transmitted to the first position-registration-signal transmitting unit 224. The first position-registration-signal transmitting unit 224, upon receiving the data D6, generates a packet (UDP) of a position registration signal (reg.req), i.e., a packet D7 of IPv6, and at step S215, transmits the packet D7 to the IPv6 network 106 through the router 105d.

Figure 5A:
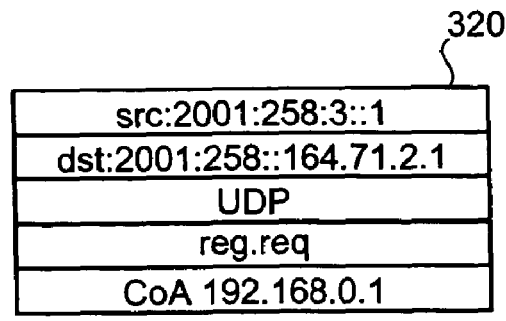
FIG. 5A to 5D are schematics of packets used in the position registration process.
Figure 5B:
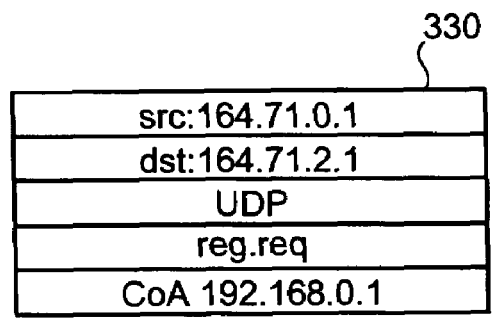
Figure 5C:
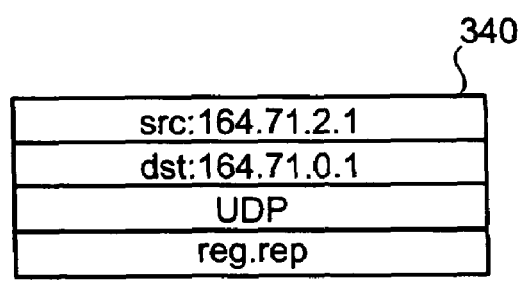
Figure 5D:
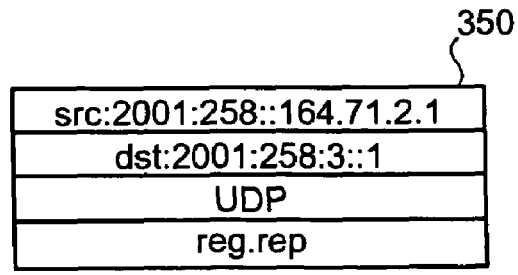

A packet transmitted from the IPv4 mobile-communication terminal 103 to the IPv4/IPv6 translator 107, i.e., a packet on a route R311 in FIG. 4, has a configuration as a packet 320 shown in FIG. 5A. In FIGS. 5A to 5D, reference symbol src denotes a source address, and reference symbol dst denotes a destination address. A protocol of UDP is used for payload. Thus, the transmission for a position registration operation in the IPv4 mobile-communication terminal 103 ends. However, unlike a case that the IPv4 mobile-communication terminal 103 is connected to the IPv4 network 101, when position registration is performed through the IPv4/IPv6 translator 107, the following processing is further performed.

The packet 320 is transmitted to the IPv4/IPv6 translator 107 based on a destination address dst. Then, a new source address [164.71.0.1:500] is allocated to the packet 320 from among IPv4 pool addresses as an IPv4 address corresponding to a IPv6 source address src [2001:258:3::1], and is set to a source address src in the IPv4 header. This correspondence is stored in the IP-address-conversion correspondence table 300. With respect to the allocated pool address [164.71.0.1:500], 500, at the end of address, denotes a port number, and 164.71.0.1 denotes an actual address.

The IPv4/IPv6 translator 107 receives the packet 320, removes the translator prefix from the source address dst, which is in the header of the packet 320, obtains a portion from where the translator prefix is removed from the source address dst, and sets the portion as a new IPv4 destination address. Thus, the packet 320 is converted into an IPv4 packet, and transmitted to the IPv4 home agent 102, which is corresponding to the destination address dst [164.71.2.1]. A packet transmitted from the IPv4/IPv6 translator 107 to the IPv4 home agent 102, i.e., a packet on a router R312, has a configuration as a packet 330 shown in FIG. 5B.

Figure 6A:
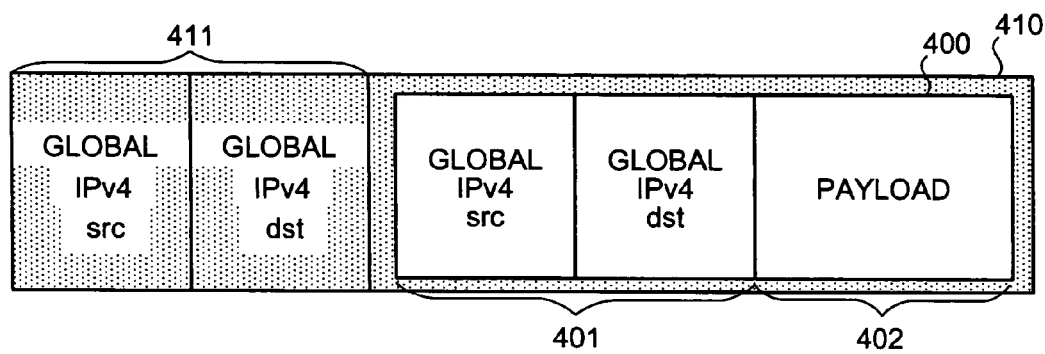
FIG. 6A is a schematic of a packet used by a typical IPv4 mobile-communication terminal.
Figure 6B:
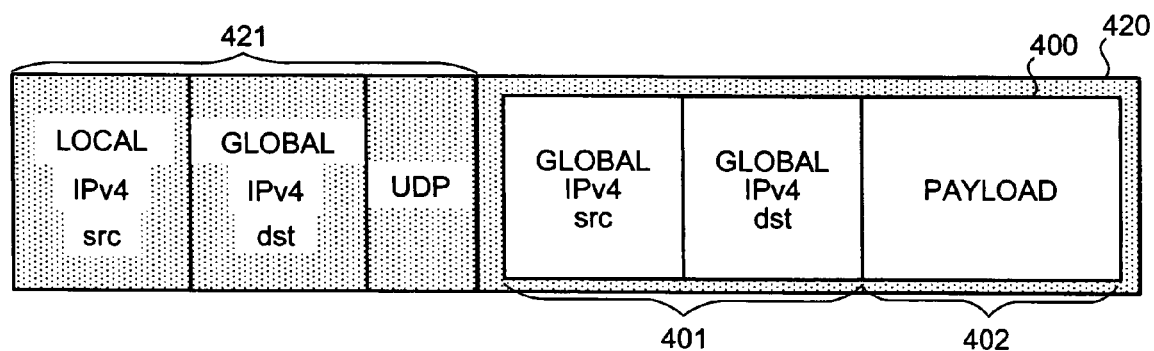
FIG. 6B is a schematic of a packet used by an IPv4 mobile-communication terminal with the NAT function.
Figure 6C:
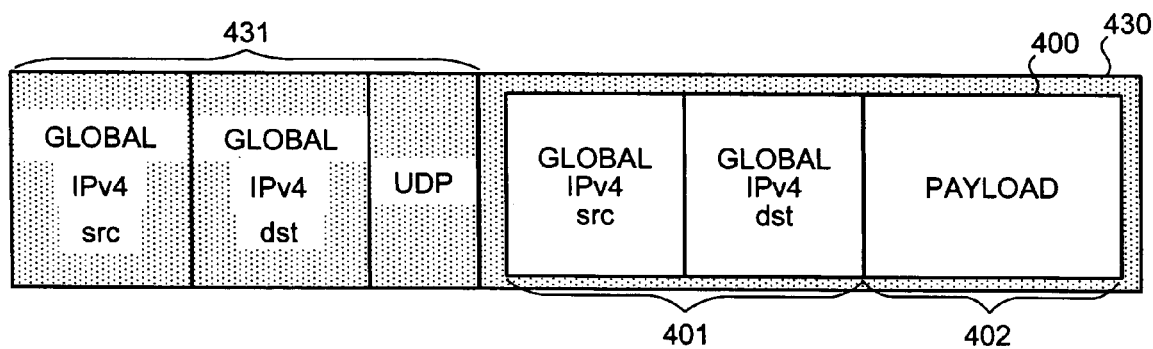
FIG. 6C is a schematic of another packet used by the IPv4 mobile-communication terminal with the NAT function.

FIGS. 6A to 6C are schematics for explaining the NAT function. In the NAT function, one global IP address is shared by a plurality of communication terminals, which are in a company or a school and connected to the Internet. An NAT function is realized by transparently and mutually converting a local address used in the company or the school and a global address used in the Internet.

FIG. 6A is a schematic of a packet of a typical IPv4 mobile-communication terminal. FIG. 6B is a schematic of a packet (before passing through NAT) of the IPv4 mobile communication terminal that has the NAT function. FIG. 6C is a schematic of a packet (after passing through NAT) of the IPv4 mobile communication terminal that has the NAT function.

When one communication terminal occupies one global address, a capsule structure includes a header 411 and a payload 400 as shown in a packet model 410 in FIG. 6A. The packet model 410 has a header 401 and a payload 402 transmitted from a source. However, when a plurality of communication terminals share one global address in a local network by using the NAT function, the payload 400 is encapsulated with a header 421 to form a packet model 420 as shown in FIG. 6B. When the packet model 420 moves to a global network, as shown in a packet model 430 in FIG. 6C, a source address src of a header is converted into a global address by the NAT function arranged at a relay point (router or the like) between the local network and the global network. When the NAT function is used as described above, the packet that includes the payload 400 uses a protocol of UDP.

The processing performed by the IPv4 home agent 102 is explained below with reference to FIG. 4. When the IPv4 home agent 102 receives the packet 330, the IPv4 home agent 102 determines that the packet 330 has passed through the NAT function unit (actually, the IPv4/IPv6 translator 107) since a source address src (IPv4 address [164.71.0.1] allocated by a translator) is different from a CoA [192.168.0.1] set in a position registration signal (reg.req), and stores the CoA and the source address in association with an HoA (a NAT traversal function). The IPv4 home agent 102 edits a position-registration confirmation signal (reg.rep), and transmits the position-registration confirmation signal to the source address src [164.71.0.1] recorded in the packet 330. A packet transmitted from the IPv4 home agent 102 to the IPv4/IPv6 translator 107, a packet on a route R313, has a configuration as a packet 340 shown in FIG. 5C.

When the IPv4/IPv6 translator 107 receives the packet 340, the IPv4/IPv6 translator 107 retrieves the destination address dst from the IP-address-conversion correspondence table 300 and sets the destination address dst to a header of the packet 340. The IPv4/IPv6 translator 107 converts the source address src into an address [2001:258::164.71.2.1], i.e., (translator prefix)+(address of the IPv4 home agent 102), sets the converted source address to the source address src, corresponding to IPv6, of the packet 340, and transmits the packet to the IPv4 mobile-communication terminal 103. A packet transmitted from the IPv4/IPv6 translator 107 to the IPv4 mobile-communication terminal 103, i.e., a packet on a route R314, has a configuration as a packet 350 shown in FIG. 5D. When the IPv4 mobile-communication terminal 103 receives the position-registration confirmation signal (reg.rep), the position registration process ends.

As described above, in the mobile communication terminal according to the embodiment, it is checked whether an address corresponding to the IP of the mobile IP communication terminal can be used in the network to which the mobile IP communication terminal is connected, and if the address can not be used, a unique CoA is generated. As a result, existing mobile IP communication terminals can be used in an environment where two or more protocols coexist.

Since the position registration process activates the NAT traversal function of the IPv4 home agent 102, a packet that has as an HoA [164.71.3.1] as a destination address dst and is transmitted to the IPv4 home agent 102 after the position registration is encapsulated by a protocol of UDP while automatically including a header. The encapsulated packet is transmitted to a pool address [164.71.0.1] of the IPv4/IPv6 translator 107, which is decided as the NAT function unit. The IPv4 mobile communication terminal 103 according to the embodiment performs transmission/reception by using the operations.

When the position registration is completed, a transmitting unit (not shown) of the IPv4 mobile-communication terminal 103 encapsulates a payload for transmission and sets a header address of IPv6, which is an IP supported by the network to which the IPv4 mobile-communication terminal 103 is connected. Then, the transmitting unit transmits a packet to the IPv4/IPv6 translator 107 so that a packet is transmitted to an IP communication terminal that has the same IP as the IPv4 mobile-communication terminal 103.

Similarly, when the position registration is completed, a receiving unit (not shown) of the IPv4 mobile-communication terminal 103 decapsulates the payload of the packet transmitted from the IPv4 communication terminal 104, and receives the packet. These transmitting/receiving operations are explained in detail below.

Figure 8A:
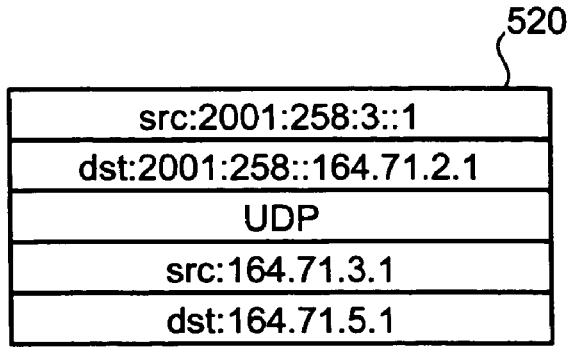
FIG. 8A to 8F are schematics of packets used in the transmission/reception process.

FIG. 7 is a schematic for explaining a transmitting/receiving process by the IPv4 mobile-communication terminal 103 that is connected to the IPv6 network 106. FIGS. 8A to 5F are schematics of packets used in the transmitting/receiving processes.

As shown in FIG. 7, it is assumed that an address of the IPv4 communication terminal 104 is [164.71.5.1]. The other addresses are the same as those shown in FIG. 4, and therefore, an explanation thereof is omitted to avoid redundant explanation.

A case is explained in which a user of the IPv4 mobile communication terminal 103 performs communications with the IPv4 communication terminal 104. In this case, a packet transmitted from the IPv4 mobile communication terminal 103 to the IPv4/IPv6 translator 107, i.e., a packet on a route R511, has a configuration as a packet 520 shown in FIG. 8A. The packet 520 is encapsulated by UDP, and an address [2001:258::164.71.2.1], i.e., (translator prefix)+(address of the IPv4 home agent 102) is set to a destination address dst of an IPv6 header, and then, the packet is transmitted.

Figure 8B:
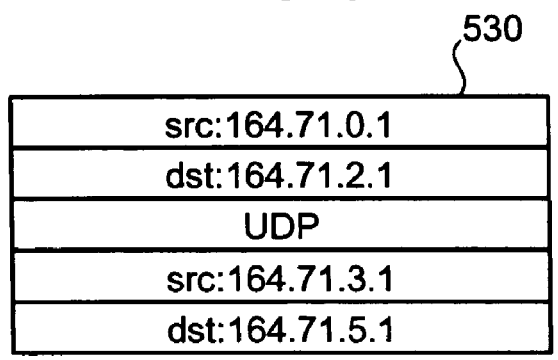

When the IPv4/IPv6 translator 107 receives the packet 520, the IPv4/IPv6 translator 107 searches the IP-address-conversion correspondence table 300, and sets the appropriate address to a source address src of a header of the packet 520 based on an association given by [164.71.0.1: 500-2001:258.3::1]. The IPv4/IPv6 translator 107 removes translator prefix from a destination address dst of the received packet 520, obtains a portion [164.71.2.1], and sets the portion [164.71.2.1] as a new destination address dst of IPv4. Then, the IPv4/IPv6 translator 107 transmits a packet 530 shown in FIG. 8B to the IPv4 home agent 102 via a route R512.

Figure 9A:
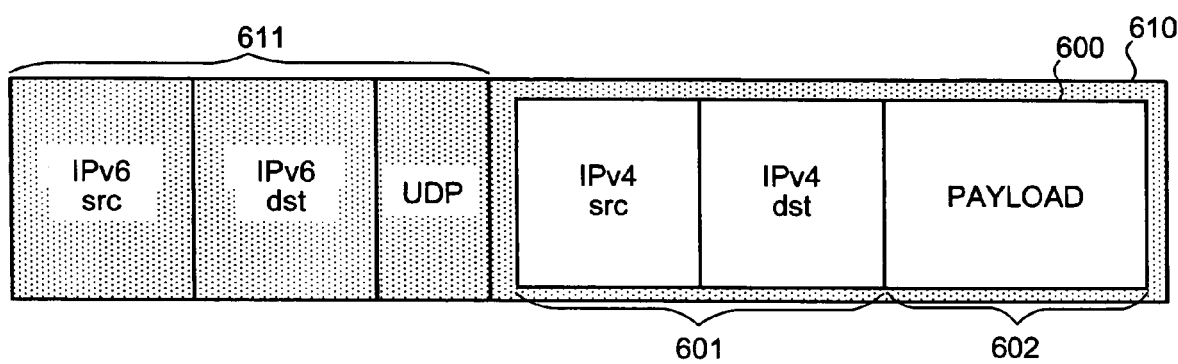
FIG. 9A is a schematic of a packet transmitted in an IPv6 network.
Figure 9B:
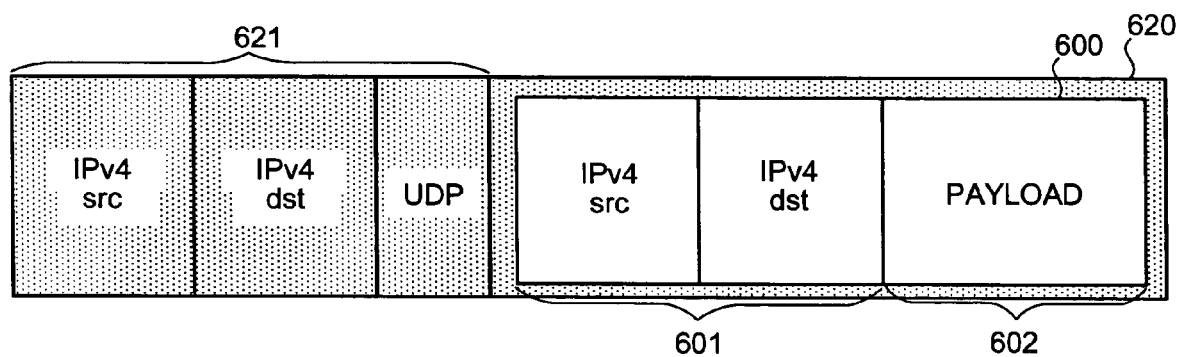
FIG. 9B is a schematic of a packet transmitted in an IPv4 network.
Figure 10:
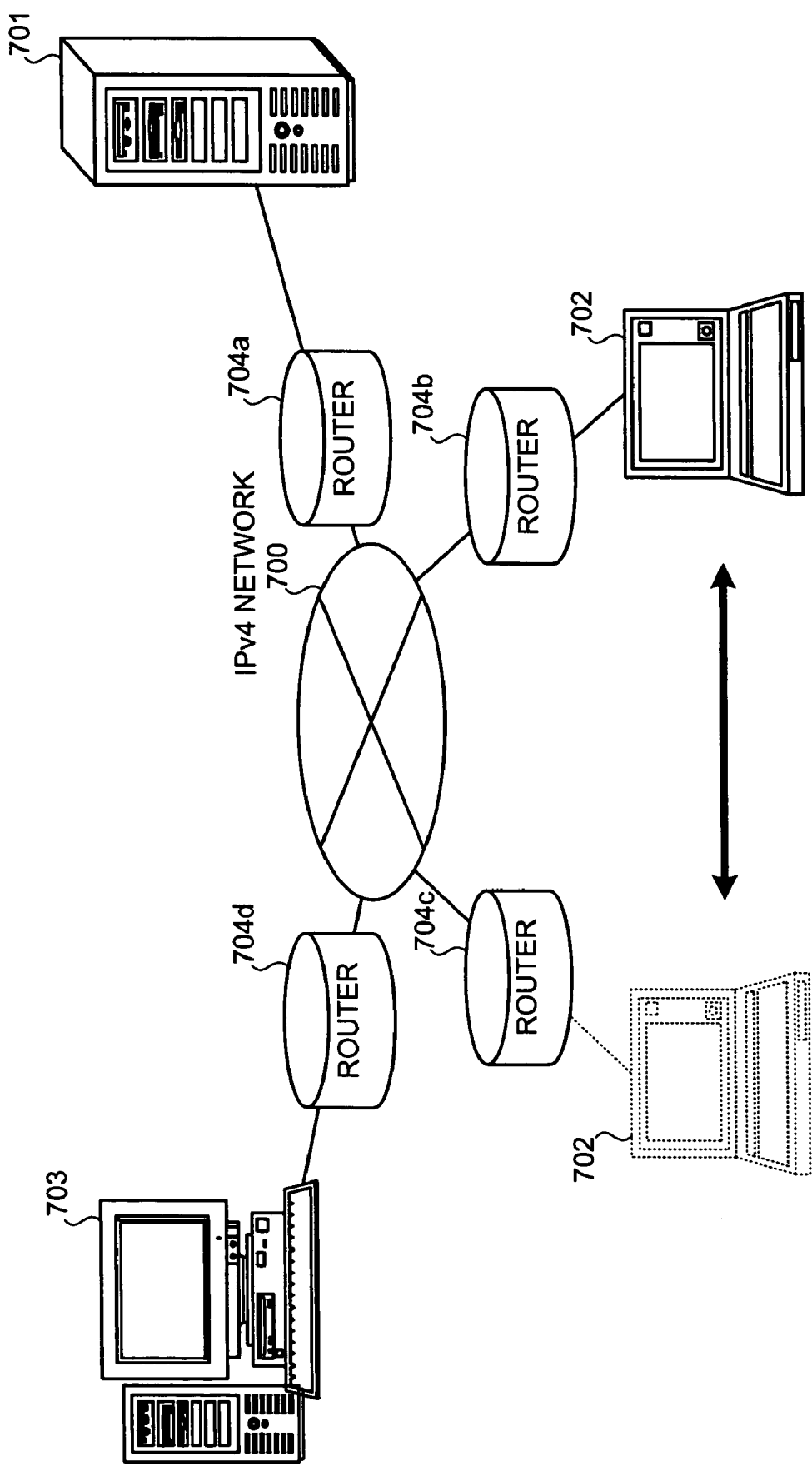
FIG. 10 is a schematic of an IPv4 network in which an IPv4 mobile-communication terminal is used.
Figure 11:
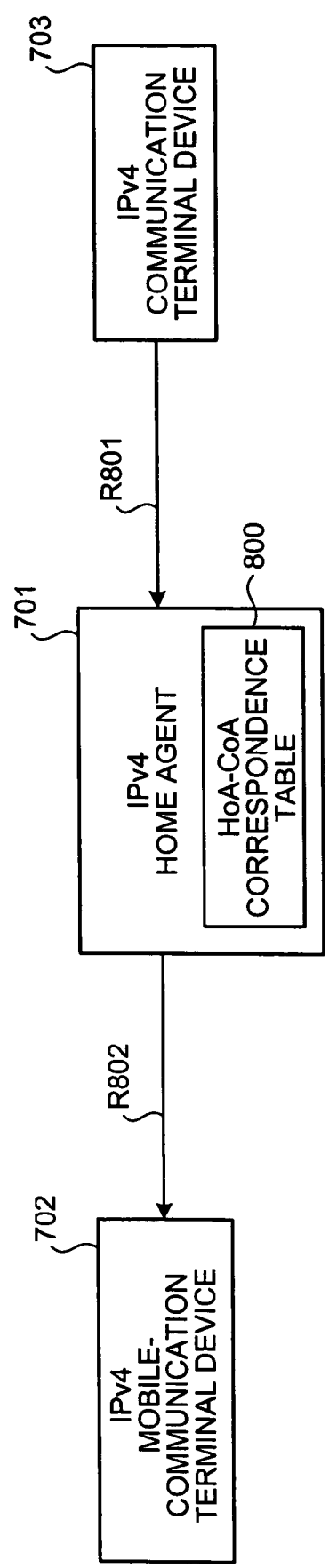
FIG. 11 is a schematic for explaining encapsulation of a packet to be transferred through the IPv4 network.
Figure 12A:
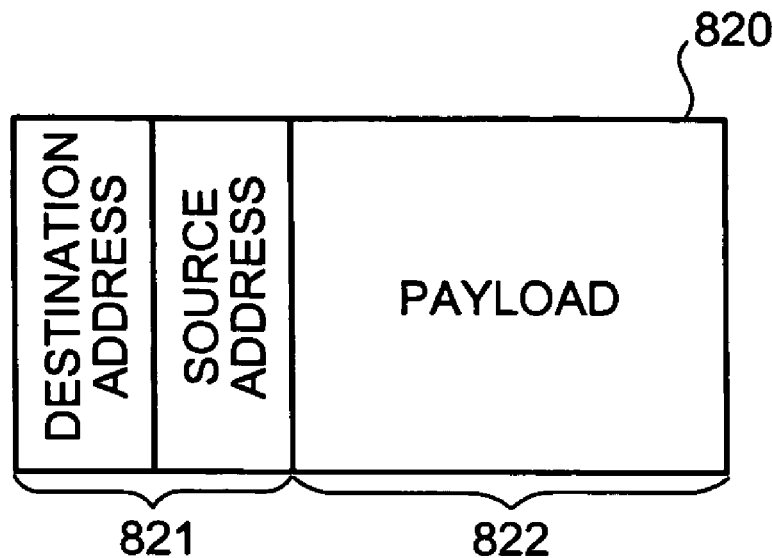
FIG. 12A is a schematic of a packet used for mobile communication in the IPv4 network.
Figure 12B:
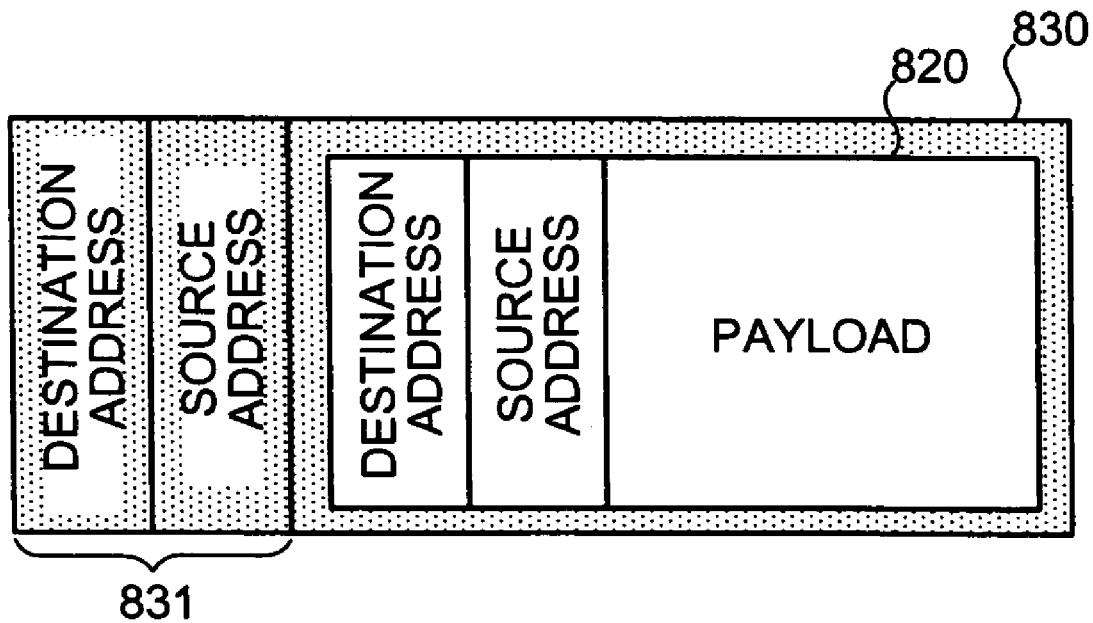
FIG. 12B is a schematic an encapsulated packet used for mobile communication in the IPv4 network.

FIG. 9A is a schematic for explaining a packet in an IPv6 network, and FIG. 9B is a schematic for explaining a packet in an IPv4 network. How the IPv4/IPv6 translator 107 converts a header of a packet is explained with reference to FIGS. 9A and 9B. A packet model 610, shown in FIG. 9A, is a packet model before the packet passes through the IPv4/IPv6 translator 107. The packet model 610 includes a payload, which is a packet obtained by encapsulating a packet model 600 by a protocol of UDP, and a header 611 obtained by IPv6. The packet model 600 includes a header 601 and a payload 602, which are obtained by IPv4, and is formed by IPv4.

A packet model 620, shown in FIG. 9B, is a packet model obtained after the packet passes through the IPv4/IPv6 translator 107. The packet model 620 includes a payload, which is a packet obtained by encapsulating the packet model 600 by a protocol of UDP, and a header 621. The header 621 includes a packet formed by IPv4.

Figure 8C:
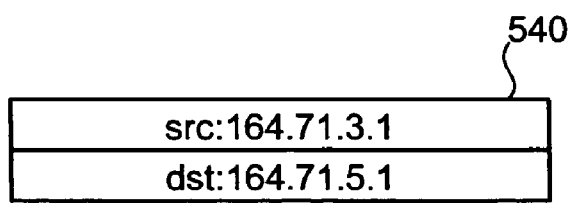

When the IPv4 home agent 102 receives the packet 530, the IPv4 home agent 102 extracts the contents, corresponding to a packet obtained by UDP, from the packet 530 and transfers the contents to the IPv4 communication terminal 104: At this time, the source address is the HoA of the IPv4 mobile communication terminal 103. Therefore, a packet transmitted from the IPv4 home agent 102 to the IPv4 communication terminal 104, i.e., a packet on a route R513, has a configuration as a packet 540 shown in FIG. 8C.

Figure 8D:
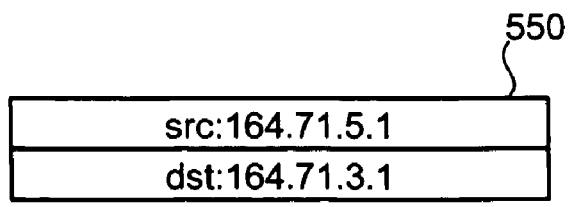

When the IPv4 communication terminal 104 receives the packet 540, the IPv4 communication terminal 104 sends back the packet to the source address (HoA [164.71.3.1] of the IPv4 mobile communication terminal 103). A packet transmitted from the IPv4 communication terminal 104 to the IPv4 home agent 102, i.e., a packet on a route R514, has a configuration as a packet 550 shown in FIG. 8D.

Figure 8E:
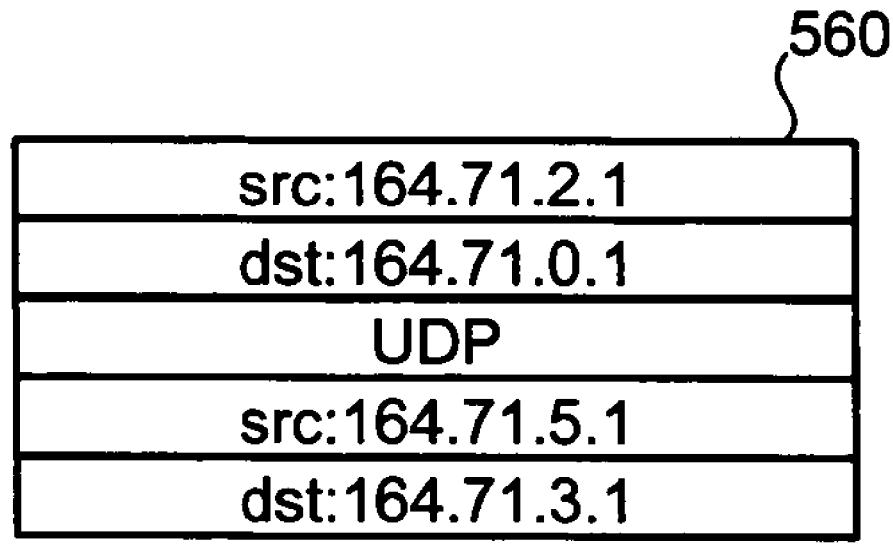

When the IPv4 home agent 102 receives the packet 550, the IPv4 home agent 102 retrieves a registered HoA from the packet 550. As a result, the packet 550 is encapsulated by a protocol of UDP and transmitted to a registered source address (address [164.71.0.1] allocated by a translator), since it is determined that the IPv4 mobile communication terminal 103 that has an HoA [164.71.3.1] is connected via a network that has the NAT function (actually, the IPv4 home agent 102 makes an erroneous decision because the IPv4 mobile communication terminal 103 uniquely sets a CoA to activate the NAT traversal function of the IPv4 home agent 102). A packet transmitted from the IPv4 home agent 102 to the IPv4/IPv6 translator 107, i.e., a packet on a route R515, has a configuration as a packet 560 shown in FIG. 8E.

Figure 8F:
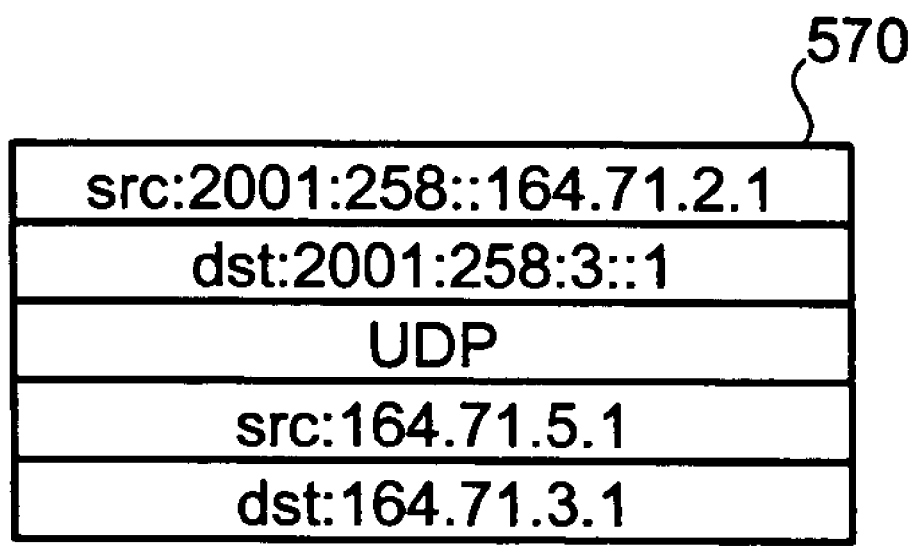

When the IPv4/IPv6 translator 107 receives the packet 560, the IPv4/IPv6 translator 107 retrieves a destination address dst from the IP-address-conversion correspondence table 300 and sets the destination address dst to a IPv6 header. The source address is converted into an address [2001:258::164.71.2.1], i.e., (translator prefix)+(address of the IPv4 home agent 102), the converted source address is set to a header address of IPv6, and the packet is transmitted to the IPv4 mobile-communication terminal 103. A packet transmitted from the IPv4/IPv6 translator 107 to the IPv4 mobile-communication terminal 103, i.e., a packet on a route R316, has a configuration as a packet 570 shown in FIG. 8F. The IPv4 mobile-communication terminal 103 receives the packet 570, and this completes a data transmitting/receiving process.

As described above, according to the mobile IP communication terminal and the mobile IP communication method, even when an IPv4 mobile-communication terminal is connected to an IPv6 network, a packet transparently passes between an IPv4 network and an IPv6 network without problem.

The mobile IP communication method according to the embodiment can be realized by causing a computer, such as a personal computer that constitutes the IPv4 mobile-communication terminal 103, to execute a prepared computer program. The computer program is recorded on a computer-readable recording medium, such as a hard disk, a flexible disk, a CD-ROM, an MO, or a DVD, and the computer reads the computer program from the recording medium to execute it. The computer program can be provided by using a transmission media, which can be delivered through a network such as the Internet.

According to the present invention, a mobile internet-protocol communication terminal that supports a first Internet protocol (e.g., IPv4) can be without trouble connected to any of a first network that supports the first IP and a second network that supports a second IP (e.g. IPv6) that is different from the first IP.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile internet-protocol (IP) communication terminal that supports a first IP, and can be connected to a first network that supports the first IP and a second network that supports a second IP that is different from the first IP, wherein when the mobile IP communication terminal is connected to the second network via a second repeater and performs a packet communication with an IP communication terminal that supports the first IP, the first network and the second network are connected via a translator to perform a packet communication, and the mobile IP communication terminal registers a connection position of the mobile IP communication terminal with a first repeater that has a packet transfer function, the mobile IP communication terminal comprising:

an IP deciding unit that decides whether the mobile IP communication terminal is connected to the first network or the second network;

a unique-address generating unit that generates a first address that is unique to the mobile IP communication terminal, when the IP deciding unit decides the mobile IP communication terminal is connected to the second network;

a translator-through address generating unit that generates a second address so as to connect the mobile IP communication terminal to the first network via the translator, based on position information of the translator stored in the second repeater, and a translator-through position-registration-signal transmitting unit that transmits a registration signal, for registering the connection position, to the first repeater, the registration signal including a destination address and a source address, the destination address having the second address and an address of the first repeater, the source address having an address of the connection position, and the address of the connection position corresponding to the second IP and acquired from the second network.

2. The mobile IP communication terminal according to claim 1, wherein the unique-address generating unit generates a random number and generates the first address based on the random number.

3. The mobile IP communication terminal according to claim 1, wherein the unique-address generating unit generates the first address based on a predetermined value.

4. The mobile IP communication terminal according to claim 1, wherein the translator-through position-registration-signal transmitting unit transmits, to the first repeater, a position-registration information signal that includes the first address.

5. The mobile IP communication terminal according to claim 1, wherein the translator-though position-registration-signal transmitting unit decides whether the connection position is registered by receiving a position-registration completion signal from the first repeater.

6. The mobile IP communication terminal according to claim 1, wherein the translator-through position-registration-signal transmitting unit sets a third address to a header address, and transmits the position-registration information signal to the first repeater, and the third address is corresponding to the second IP and generated in response to a router advertisement from the second network.

7. The mobile IP communication terminal according to claim 1, further comprising a transmitting unit that transmits a packet to the translator by encapsulating a payload and setting a header address corresponding to the second IP, wherein the packet includes the payload and the header address.

8. The mobile IP communication terminal according to claim 1, further comprising a receiving unit that receives a packet from the IP communication terminal that supports the first IP, by decapsulating a payload of the packet.

9. The mobile IP communication terminal according to claim 1, further comprising a position-registration-signal transmitting unit that, when the IP deciding unit decides that the mobile IP communication terminal is connected to the first network, acquires the address of the connection position and transmits a position registration signal to the first repeater so as to register the connection position.

10. A mobile internet-protocol (IP) communication method performed by a mobile internet-protocol (IP) communication terminal, wherein
the mobile IP communication terminal supports a first IP, and can be connected to a first network that supports the first IP and a second network that supports a second IP that is different from the first IP, and
when the mobile IP communication terminal is connected to the second network via a second repeater and performs a packet communication with an IP communication terminal that supports the first IP, the first network and the second network are connected via a translator to perform a packet communication, and the mobile IP communication terminal registers a connection position of the mobile IP communication terminal with a first repeater that has a packet transfer function,
the mobile IP communication method comprising:
deciding whether the mobile IP communication terminal is connected to the first network or the second network based;
generating a first address that is unique to the mobile IP communication terminal, when it is decided in the deciding that the mobile IP communication terminal is connected to the second network;
generating a second address so as to connect the mobile IP communication terminal to the first network via the translator, based on position information of the translator stored in the second repeater, and
transmitting a registration signal, for registering the connection position, to the first repeater, the registration signal including a destination address and a source address, the destination address having the second address and an address of the first repeater, the source address having an address of the connection position, and the address of the connection position corresponding to the second IP and acquired from the second network.

11. The mobile IP communication method according to claim 10, further comprising acquiring the address of the connection position and transmitting a position registration signal to the first repeater so as to register the connection position, when it is decided in the deciding that the mobile IP communication terminal is connected to the first network.

12. A computer-readable recoding medium having a stored computer program that implements mobile internet-protocol (IP) communication method on a computer, wherein
the computer supports a first IP, and can be connected to a first network that supports the first IP and a second network that supports a second IP that is different from the first IP, and
when the computer is connected to the second network via a second repeater and performs a packet communication with an IP communication terminal that supports the first IP, the first network and the second network are connected via a translator to perform a packet communication, and the computer registers a connection position of the computer with a first repeater that has a packet transfer function, the computer program causing the computer to execute:
deciding whether the computer is connected to the first network or the second network based;
generating a first address that is unique to the computer, when it is decided in the deciding that the computer is connected to the second network;
generating a second address so as to connect the computer to the first network via the translator, based on position information of the translator stored in the second repeater, and
transmitting a registration signal, for registering the connection position, to the first repeater, the registration signal including a destination address and a source address, the destination address having the second address and an address of the first repeater, the source address having an address of the connection position, and the address of the connection position corresponding to the second IP and acquired from the second network.

* * * * *